United States Patent
Westberg et al.

(10) Patent No.: US 11,226,832 B2
(45) Date of Patent: Jan. 18, 2022

(54) DYNAMIC GENERATION OF USER INTERFACES BASED ON DIALOGUE

(71) Applicant: International Business Machines Corporation, Armonk, NY (US)

(72) Inventors: Anders Westberg, Svartsjo (SE); Mikael Haglund, Gothenburg (SE); Juraj Lesko, Stockholm (SE); Anders Enqvist, Taby (SE)

(73) Assignee: International Business Machines Corporation, Armonk, NY (US)

(*) Notice: Subject to any disclaimer, the term of this patent is extended or adjusted under 35 U.S.C. 154(b) by 98 days.

(21) Appl. No.: 16/185,503

(22) Filed: Nov. 9, 2018

(65) Prior Publication Data

US 2020/0150981 A1   May 14, 2020

(51) Int. Cl.
| | |
|---|---|
| *G06F 9/451* | (2018.01) |
| *G06F 3/0481* | (2013.01) |
| *G06N 99/00* | (2019.01) |
| *G06F 9/54* | (2006.01) |
| *G06N 20/00* | (2019.01) |
| *G06F 40/205* | (2020.01) |

(52) U.S. Cl.
CPC ............ *G06F 9/451* (2018.02); *G06F 3/0481* (2013.01); *G06F 9/542* (2013.01); *G06F 40/205* (2020.01); *G06N 20/00* (2019.01)

(58) Field of Classification Search
CPC ........ G06F 9/451; G06F 40/205; G06F 9/542; G06F 3/0481; G06F 8/38; G06F 40/30; G06F 40/216; G06F 9/547; G06F 9/541; G06N 20/00
See application file for complete search history.

(56) References Cited

U.S. PATENT DOCUMENTS

| | | | |
|---|---|---|---|
| 5,734,837 A | 3/1998 | Flores et al. | |
| 5,890,133 A | 3/1999 | Ernst | |
| 6,507,856 B1 | 1/2003 | Chen et al. | |
| 6,941,521 B2 | 9/2005 | Lin et al. | |
| 9,008,286 B2 | 4/2015 | Ni et al. | |
| 2010/0086110 A1 | 4/2010 | Boussard et al. | |
| 2010/0241978 A1 | 9/2010 | Genovese et al. | |
| 2013/0198243 A1 | 8/2013 | Givens | |
| 2015/0256677 A1 | 9/2015 | Konig et al. | |
| 2016/0259775 A1* | 9/2016 | Gelfenbeyn | G06F 40/35 |
| 2017/0177710 A1* | 6/2017 | Burlik | G01C 21/3667 |
| 2017/0192827 A1* | 7/2017 | Ghafourifar | G06F 9/543 |
| 2017/0351342 A1* | 12/2017 | Kandur Raja | G06F 3/0237 |
| 2017/0357637 A1* | 12/2017 | Nell | G06F 3/167 |
| 2019/0164540 A1* | 5/2019 | Park | G06F 40/295 |
| 2020/0012423 A1* | 1/2020 | Cinek | G06F 9/451 |
| 2021/0005191 A1* | 1/2021 | Chun | G10L 15/22 |

* cited by examiner

*Primary Examiner* — Jennifer N Welch
*Assistant Examiner* — Parmanand D Patel
(74) *Attorney, Agent, or Firm* — Lieberman & Brandsdorfer, LLC

(57) ABSTRACT

Embodiments relate to a system, program product, and method for use with an intelligent computer platform to automated and integrated cognitive processing. The embodiments support a mechanism for dynamically detecting a communication, and evaluating the communication with respect to actions and services. The actions are translated to APIs, which are leveraged to dynamically construct a User Interface (UI) as a representation of the evaluated services. The constructed UI is created as a service output to members of the detected communication.

15 Claims, 11 Drawing Sheets

| Identifier | Model | Category | API Sequence |
|---|---|---|---|
| $Identifier_0$ | $Model_0$ | $Category_0$ | $Sequence_0$ |
| $Identifier_1$ | $Model_1$ | $Category_1$ | $Sequence_1$ |
| $Identifier_2$ | $Model_2$ | $Category_2$ | $Sequence_2$ |
| $Identifier_3$ | $Model_3$ | $Category_3$ | $Sequence_3$ |

FIG. 5

DYNAMIC GENERATION OF USER INTERFACES BASED ON DIALOGUE

BACKGROUND

The present embodiments relate to natural language processing and cognitive content observation and management. More specifically, the embodiments relate to recognizing and resolving cognitive content and automatically integrating a service response module commensurate with the observed cognitive content.

In the field of artificially intelligent computer systems, natural language systems (such as the IBM Watson® artificially intelligent computer system or other natural language question answering systems) process natural language based on knowledge acquired by the system. To process natural language, the system may be trained with data derived from a database or corpus of knowledge relating to the peculiarities of language constructs and human reasoning.

Machine learning (ML), which is a subset of Artificial intelligence (AI), utilizes algorithms to learn from data and create foresights based on this data. AI refers to the intelligence when machines, based on information, are able to make decisions, which maximizes the chance of success in a given topic. More specifically, AI is able to learn from a data set to solve problems and provide relevant recommendations. Cognitive computing is a mixture of computer science and cognitive science. Cognitive computing utilizes self-teaching algorithms that use data minimum, visual recognition, and natural language processing to solve problems and optimize human processes.

At the core of AI and associated reasoning lies the concept of similarity. The process of understanding natural language requires reasoning from a relational perspective that can be challenging. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly. Existing solutions for efficiently identifying and understanding natural language and processing content response to the identification and understanding as well as changes to the structures are extremely difficult at a practical level.

SUMMARY

The embodiments include a system, computer program product, and method for natural language content processing, including natural language understanding and user interface (UI) development and processing.

In one aspect, a system is provided for use with an intelligent computer platform to process and evaluate a communication and construct a service output commensurate with the evaluated communication. A processing unit is provided in the system operatively coupled to memory. A tool is further provided in communication with the processing unit, and configured with managers to support and enable NLP processing and UI development. The managers include, but are not limited to, a content manager, a classification manager, and an interface manager. The content manager functions to dynamically detect and process a communication, including service category identification, service attribute(s), and action sequencing. The interface manager functions to dynamically construct the UI as a representation of a service response to the detected and evaluated communication. More specifically, the interface manager translates and sequences two or more APIs as related to the service attribute(s) and action sequencing. The interface manager dynamically constructs the UI based on the communication, with the constructed UI employing the sequenced APIs.

In another aspect, a computer program device is provided for use with an intelligent computer platform to integrate NLP with UI development. The device has program code embodied therewith. The program code is executable by a processing unit to dynamically detect and process a communication, including service category identification, service attribute(s), and action sequencing. Program code is provided to dynamically construct the UI as a representation of a service response to the detected and evaluated communication. More specifically, the program code translates and sequences two or more APIs as related to the service attribute(s) and action sequencing. The program code dynamically constructs the UI based on the communication, with the constructed UI employing the sequenced APIs.

In yet another aspect, a method is provided for use by an intelligent computer platform for a system with an intelligent computer platform to process and evaluate a communication and construct a service output commensurate with the evaluated communication. A communication is detected and dynamically processed, including service category identification, service attribute(s), and action sequencing. The UI is dynamically constructed as a representation of a service response to the detected and evaluated communication. More specifically, two or more APIs as related to the service attribute(s) and action sequencing are translated and sequenced. The UI is dynamically constructed based on the communication and employing the sequenced APIs.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings reference herein forms a part of the specification. Features shown in the drawings are meant as illustrative of only some embodiments, and not of all embodiments, unless otherwise explicitly indicated.

FIG. 5 depicts a block diagram illustrating an example data structure of model categorization.

DETAILED DESCRIPTION

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

An Application Programming Interface (API), is a set of commands, functions, protocols, and objects that programmers can use to create software or interact with an external system. APIs provide developers with User Interface (UI) controls and elements, such as windows, scroll bars, and dialog boxes. APIs also provide commands for accessing an associated file system and performing file operations, such as creating and deleting files. In one embodiment, one or more APIs may include networking commands that can be used to send and receive data over a local or global network. For example, in an embodiment with a visual display with a capacitive sensor, one or more APIs may be utilized to provide commands for detecting touchscreen input, a virtual keyboard, and/or navigation buttons. Similarly, in one embodiment, one or more APIs may include predefined functions for interacting with device hardware. Accordingly, APIs provide developers with standard commands for performing common or known operations.

Operating system APIs allow developers to invite elements into an application interface. The tools and methods shown and described herein integrate natural language processing (NLP) with APIs for UI development. APIs are employed to match service output and optimize action suggestions into a UI form, which is presented to one or more members of a communication, e.g. conversation.

Figure 1:
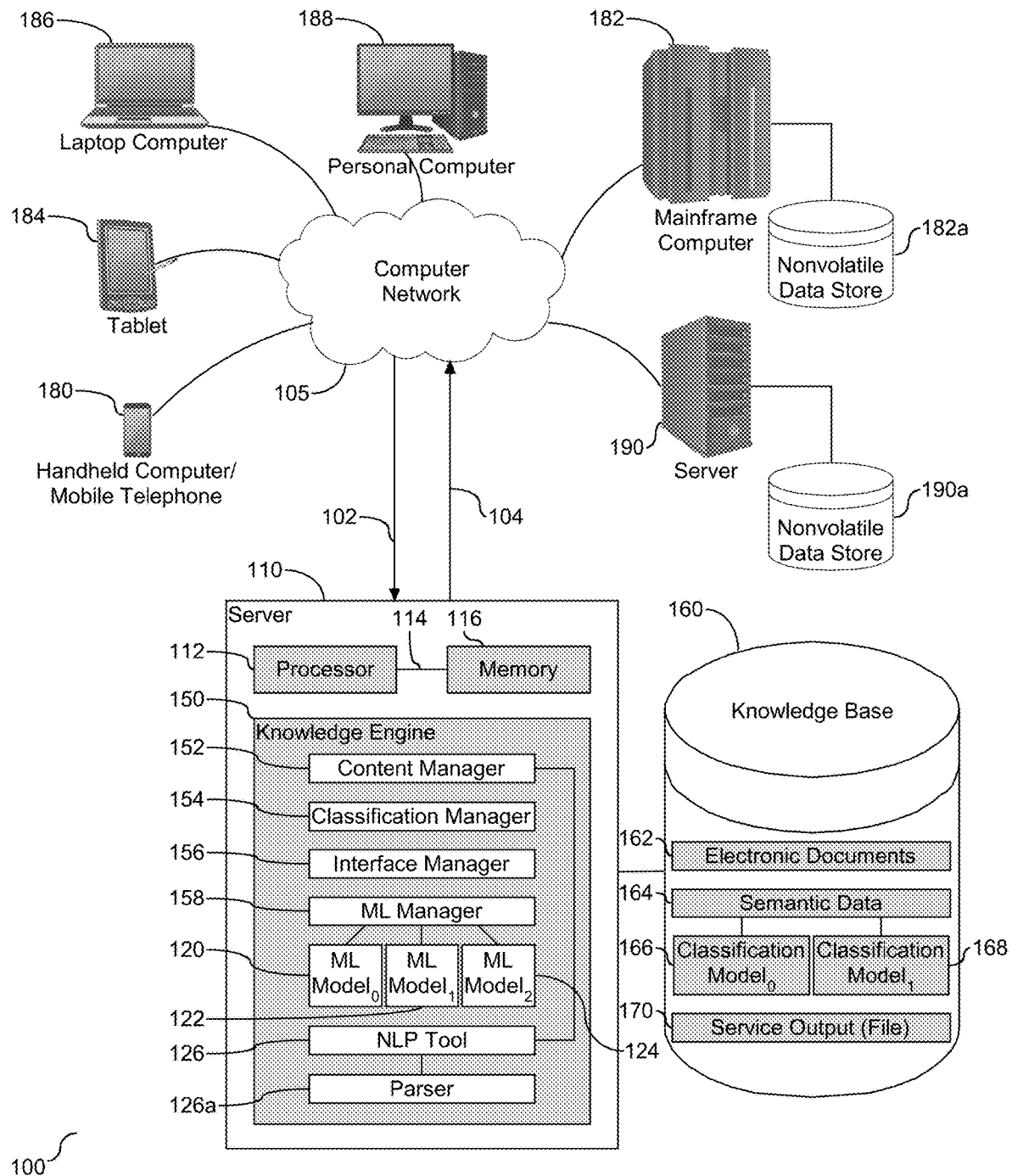
FIG. 1 depicts a system diagram illustrating a schematic diagram of a natural language process system.

Referring to FIG. 1, a schematic diagram of a natural language process system (100) is depicted. As shown, a server (110) is provided in communication with a plurality of computing devices (180), (182), (184), (186), and (188) across a network connection (105). The server (110) is configured with a processing unit (112) in communication with memory (116) across a bus (114). The server (110) is shown with a knowledge engine (150) for natural language processing (NLP) over the network (105) from one or more computing devices (180), (182), (184), (186) and (188). More specifically, the computing devices (180), (182), (184), (186), and (188) communicate with each other and with other devices or components via one or more wired and/or wireless data communication links, where each communication link may comprise one or more of wires, routers, switches, transmitters, receivers, or the like. In this networked arrangement, the server (110) and the network connection (105) may enable content and/or context recognition and resolution for one or more content users. Other embodiments of the server (110) may be used with components, systems, sub-systems, and/or devices other than those that are depicted herein.

The knowledge engine (150) may be configured to receive input from various sources. For example, knowledge engine (150) may receive input from the network (105), one or more knowledge bases of corpus (160) of electronic documents (162), semantic data (164), or other data, content users, and other possible sources of input. In one embodiment, the semantic data (164) includes one or more classification models, (166) and (168), against which content is processed and classified. In selected embodiments, the knowledge base (160), also referred to herein as corpus, may include structured, semi-structured, and/or unstructured content in a plurality of documents that are contained in one or more large knowledge databases or corpus. The various computing devices (180), (182), (184), (186), and (188) in communication with the network (105) may include access points for content creators and content users. The network (105) may include local network connections and remote connections in various embodiments, such that the knowledge engine (150) may operate in environments of any size, including local and global, e.g. the Internet. Additionally, the knowledge engine (150) serves as a front-end system that can make available a variety of knowledge extracted from or represented in documents, communications, network accessible sources, and/or structured data sources. In this manner, some processes populate the knowledge engine (150), with the knowledge engine (150) also including input interfaces to receive requests and respond accordingly.

As shown, content may be in the form of one or more electronic documents or files (162) for use as part of the corpus (160) of data with the knowledge engine (150). The corpus (160) may include any structured and unstructured documents or files (162), including but not limited to any file, text, article, or source of data (e.g. scholarly articles, dictionary, definitions, encyclopedia references, and the like) for use by the knowledge engine (150). Content users may access the knowledge engine (150) via a network connection or an internet connection to the network (105), and may submit natural language input to the knowledge engine (150) that may effectively interface with the semantic data (164). As further described, semantic content is structured content, which may take the form of a classification model. The knowledge base (160) is shown with two classification models, shown as classification model$_0$ (166) and classification model$_1$ (168). Although only two models are shown herein, the quantity should not be considered limiting. Accordingly, as shown and described the knowledge base (160) is operatively coupled to the network (105) via the server (110), and stores content (162) and semantic data (164).

The knowledge engine (150), also referred to herein as an information handling system, is populated with tools in the form of a content manager (152), a classification manager (154), an interface manager (156), and a machine learning (ML) manager (158). Although only four managers are shown and described herein, the quantity should not be considered limiting. The content manager (152) functions to interface with communications, including text based communications and oral communications, hereinafter referred to collectively as content. The content manager (152) interfaces with one or more files populated in the knowledge base (160). In one embodiment, these files are unstructured documents or files (162), hereinafter referred to collectively as files. The content manager (152) is an artificial intelligence (AI) platform configured to receive and process content. The content manager (152) functions as a front-end system to detect and receive content from content creators and content users. More specifically, the content manager (152) leverages the knowledge base (160) to determine a meaning of received content, such as, but not limited to, intent, analogies, idioms, etc. The content manager (152) evaluates the content using a variety of conventions to query the content against the knowledge base (160) and the electronic document (162) and semantic content (164) stored therein. Semantic content is content based on the relation between signifiers, such as words, phrases, signs, and symbols, and what they stand for, their denotations, or connotation(s). In other words, semantic content is content that interprets and expression, which in one embodiment may employ Natural Language Processing (NLP). In one embodiment, the process sends well-formed content (102), e.g. natural language text, to the knowledge engine (150), so that the content (102) may be interpreted with respect to identifying APIs and UI development.

In some illustrative embodiments, server (110) may be the IBM Watson® system available from International Business Machines Corporation of Armonk, N.Y., which is augmented with the mechanisms of the illustrative embodiments described herein. The IBM Watson® knowledge manager system may receive input content (102) which it then parses to extract the features of the content (102) that in turn are then applied to the corpus of data stored in the knowledge base (160) via the knowledge engine (150). Based on application of the content (102) to the corpus of data, the knowledge engine (150) and associated managers (152)-(158) process the content with respect to a classification model and an associated ML model to generate service output in the form of a constructed UI commensurate with a position or class within the selected or identified classification models (166) or (168).

In particular, received content (102) may be processed by the IBM Watson® server (110) which performs analysis on the language of the input content (102) and the language used. Such analysis may include, but is not limited to, identification and analysis of words and phrases, analogies, analogical patterns, idioms, etc., for the input content (102), and identifies similar content populated in the knowledge base (160). Though shown as being embodied in or integrated with the server (110), the managers (152)-(158) may be implemented in a separate computing system (e.g., 190) that is connected across network (105) to the server (110). Wherever embodied, the managers (152)-(158) detects and categorizes received content (102), and in addition identifies similar content and associated APIs. In one embodiment, the content manager (152) utilizes a parser (not shown), e.g. linguistic parser, to perform a content and/or sentence structure analysis to parse sentences and denote terms therein. Accordingly, NL language is processed and integrated with the managers and tools of the knowledge engine (150).

Types of information handling systems that can utilize system (110) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet, computer (184), laptop, or notebook, computer (186), personal computer system (188), and server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store (190a), and mainframe computer (182) utilizes nonvolatile data store (182a). The nonvolatile data store (182a) can be a component that is external to the various information handling systems or can be internal to one of the information handling systems.

To process natural language (NL), the system utilizes the content manager (152) to detect and categorize oral and written communications. For example, in one embodiment, the content manager (152) identifies and analyzes analogies by detecting and categorizing analogical patterns, generating potential meanings for the detected analogical patterns, and identifying a meaning or a potential meaning of the detected analogical patterns based on characteristic data and metadata. Similarly, the content manager (152) identifies and analyzes idioms based on characteristic data and metadata. Accordingly, the content manager (152) functions to detect and categorize NL based on characteristic data and metadata.

The content manager (152) parses the received communication into components, e.g. grammatical components, and translates the components into service categories. More specifically, the content manager (152) identifies the relationship or connection of keywords in the parsed communication(s), and analyzes the keywords for characteristic data or metadata, e.g. by using the definition of the terms, for use in determining an outcome or meaning of the communication(s). A definition of a term or phrase, as used herein, is an explanation of the meaning of the term or phrase. The content manager (152) leverages the knowledge base (160) to identify the service category. For example, in one embodiment, the content manager (152) may leverage previous content-service category relationships in a similar pattern stored in the knowledge base (160). Accordingly, the content manager (152) may present the parsed content and associated characteristic data to the knowledge base (160) to assess and identify one or more similar patterns and content-service category relationships.

Each service category has a corresponding attribute that quantifies or qualifies the properties of the category. The content manager (152) identifies the relationship or correspondence between the parsed content and the service category. It is understood that in one embodiment the content manager (152) may identify more than one service category associated with or defined by the parsed content. The content manager (152) further processes the received communication(s) to identify actions as related to the parsed content, and in one embodiment as related to the one or more service categories. For example, in one embodiment, the service category may have an action or a set of actions to support the service. The set of actions may be dependent or interdependent. In one embodiment, the action(s) may be independent of the service category. It is understood that any actions identified by the content manager (152) are related to the received and parsed communication(s). The content manager (152) correlates the identified action(s) to the processed communication(s) to assign or otherwise provide an order or sequence to the identified action(s). The order or sequence may directly or indirectly correspond to the processed communication(s) or to the identified service category(s). For example, in one embodiment, order may be determined by the service categories, with each service category having an order, e.g. sub-order, of actions therein. Accordingly, the content manager (152) identifies service categories and action(s) for the processed communication (s), and creates the order or arrangement of the actions.

As further shown, the classification manager (154) is operatively coupled to the content manager (152). The classification manager (154) functions as a translator or translation interface between the identified actions and one or more application program interfaces (API). In one embodiment, there may be a one-on-one correspondence between an action and a corresponding API. Similarly, in one embodiment, there may be two or more APIs corresponding to an action. In another embodiment, the API(s) may correspond to the associated service category, or the order or arrangement of the actions. The classification manager (154) employs the order or arrangement of actions created by the content manager (152) and the identified service category(s), and translates the actions into one or more APIs. Accordingly, the classification manager (154) functions as a translation platform for the order or arrangement of actions created by the content manager (152).

The APIs identified and/or selected by the classification manager (154) are programmable interfaces. In one embodiment, one or more of the identified APIs are modified or combined to correlate with the identified and corresponding action(s). As shown, the interface manager (156) is provided in communication with the classification manager (154), with the interface manager (156) configured to dynamically construct a user interface (UI) as a representation of the action(s) represented as APIs and the service category(s). More specifically, the interface manager (156) translates two or more of the represented APIs into UI protocols, such as interface schemas and protocols. The interface manager (156) constructs the UI as a service output that is commensurate with the detected and evaluated communication(s). The UI is saved in the knowledge base (160) so that it may be leveraged in future communication processing and UI service output. Accordingly, the UI is dynamically constructed from the sequence of actions and represented APIs.

As shown, the knowledge engine (150) includes a ML manager (158). More specifically, the ML manager (158) generates or creates one or more ML models shown herein as ML Model$_0$ (120), ML Model$_1$ (122), and ML Model$_2$ (124). Although only three models are shown, this quantity should not be considered limiting. The ML models are configured to correspond with a constructed UI service output. Instead of constructing the UI service output, the classification manager (154) may identify and/or select a UI service output from the knowledge base (160) based on an associated identifier and/or characteristic data. The ML manager (158) identifies or creates a ML model (120)-(124) corresponding to the UI service output and the corresponding communication(s). In one embodiment, the ML manager (158) selects the corresponding ML model from a pool of existing models. The selected or generated ML model is configured to interface with the corresponding classification manager (154). For example, in one embodiment, the classification manager (154) interfaces with the ML manager (158) to identify a ML model, e.g. ML model (122), corresponding to the corresponding APIs and service category(s), which dynamically creates the UI service output (170) or an amended version of the UI service output, e.g. an amended file or an amended article of manufacture. It is understood that the generated file identifies or is otherwise associated with members of the communication, and the member(s) has metadata directed at one or more identifying characteristics. The classification manager (154) utilizes the owner or recipient metadata and classifies the owner or intended recipient into a category or position within an associated classification model. Accordingly, the amended file corresponds to the identified position in the classification model.

As shown, the ML manager (158) interfaces with the content manager (152), classification manager (154), and an associated or identified classification model. It is understood that the classification model is not static, and as such is subject to change. Changes or amendments to the classification model are detected by the classification manager (154), and the detection is communicated to the corresponding ML model, e.g. ML model (122). In one embodiment, it is understood that the changes or amendments to the classification model may affect the generated file. The ML manager (158) evaluates and identifies the detected changes or amendments to the classification model, and dynamically re-calculates a mapping of the APIs, which effectively and dynamically creates or re-creates an amended or new ML model and a corresponding amended UI service output (170), e.g. an amended file or an amended article of manufacture. Accordingly, both the structure and content of the classification model are managed by the classification manager (154), which interfaces with the ML manager (158) to dynamically implement changes from the APIs to the UI service output.

The managers (152)-(158) shown herein function in a dynamic manner to process communications. As shown, the content manager (152) directly interfaces with the communication(s) and is configured to integrate natural language (NL) and associated processing of the NL. In one embodiment, a separate NLP tool (126) is provided and operatively coupled to the content manager (152) to facilitate processing of received or detected content (102), e.g. natural language text, to the knowledge engine (150), so that the content (102) may be interpreted and processed. As shown herein, the NLP tool (126) is coupled to a parser (126*a*) to support the NLP of the communication(s). More specifically, the content manager (152) evaluates the detected content to understand the context, and in one embodiment to identify similar context. The classification manager (154) and interface manager (156) function to dynamically classify the detected content, identify APIs in support of services for the classified content, and generate a UI for a service response and actions commensurate to support and address the content. The ML manager (158), with the corresponding ML models, evaluates and stores the generated UI as a ML model, which may be consulted with respect to a communication to selectively match an evaluated communication with a categorized and stored ML model. Accordingly, the knowledge engine (150) is configured to process NL and to adaptively integrate the NL with the managers (152)-(158) to generate the UI service output (170).

Figure 2:
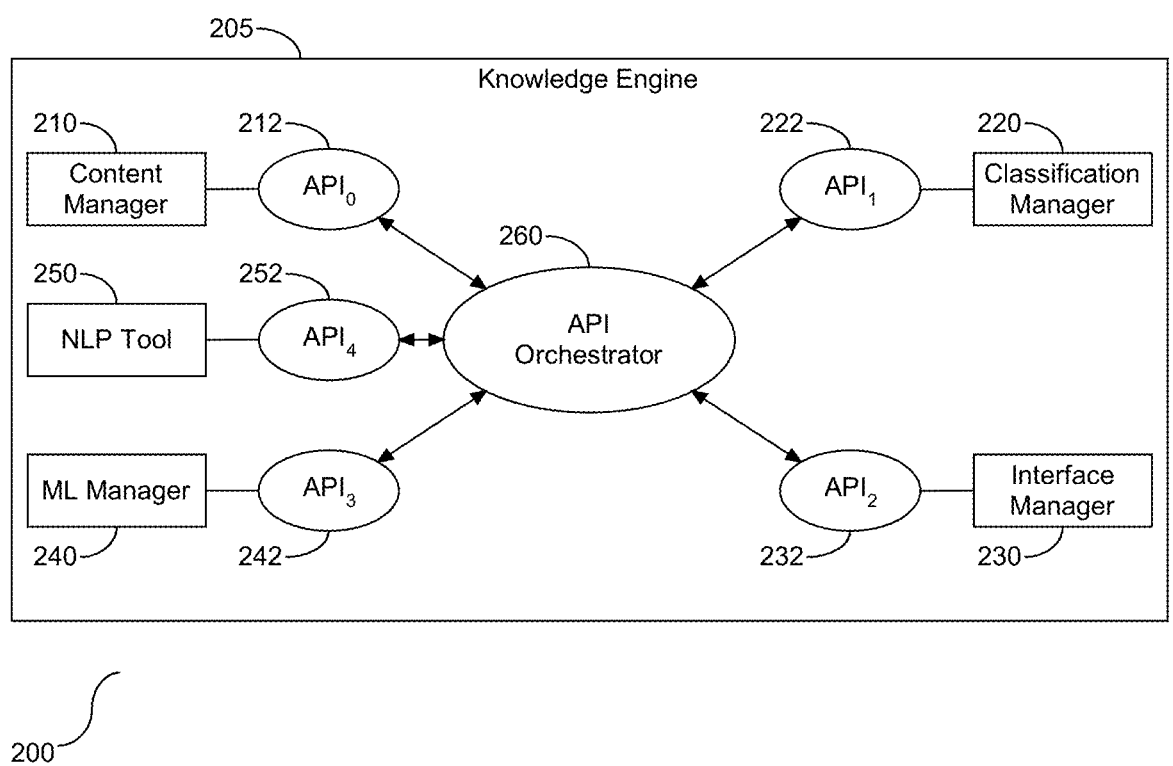
FIG. 2 depicts a block diagram illustrating the NL processing tools and their associated manager functionality in the form of APIs.

As shown and described in FIG. 1, the communication content is parsed, an action corresponding to the content is identified together with a corresponding API. The API is understood in the art as a software intermediary between two or more applications. With respect to the NL processing system shown and described in FIG. 1, one or more APIs may be utilized to support one or more of the managers (152)-(158) and their associated functionality. Referring to FIG. 2, a block diagram (200) is provided illustrating the NL processing tools and their associated manager functionality in the form of APIs. As shown, a plurality of managers are embedded within the knowledge engine (205), with the tools including the content manager (210) associated with $API_0$ (212), the classification manager (220) associated with $API_1$ (222), the interface manager (230) associated with $API_2$ (232), and the ML manager (240) associated with $API_3$ (242). Each of the APIs, (212), (222), (232), and (242), may be implemented in one or more languages and interface specifications. $API_0$ (212) supports dynamic content detect and action evaluation; $API_1$ (222) translates tasks and associated service attributes to two or more APIs; $API_2$ (232) dynamically constructs a UI representation of a service response; and $API_3$ (242) provides management and support of ML model(s) corresponding to UI representation. In one embodiment, the NPL tool (250) is provided and includes an associated $API_4$ (252). As shown, each of the APIs (212), (222), (232), and (242), and in one embodiment (252), are operatively coupled to an API orchestrator (260), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3A:
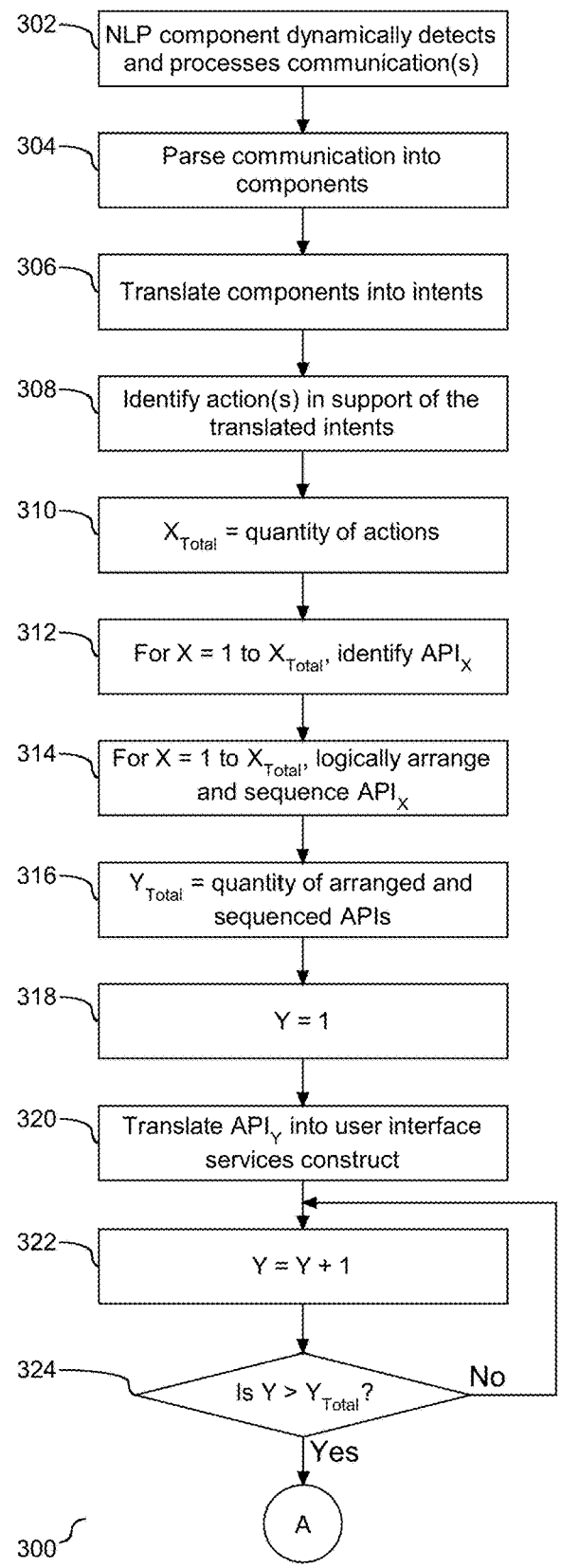
FIGS. 3A and 3B depict a flow chart illustrating a process for dynamically constructing a UI.
Figure 3B:
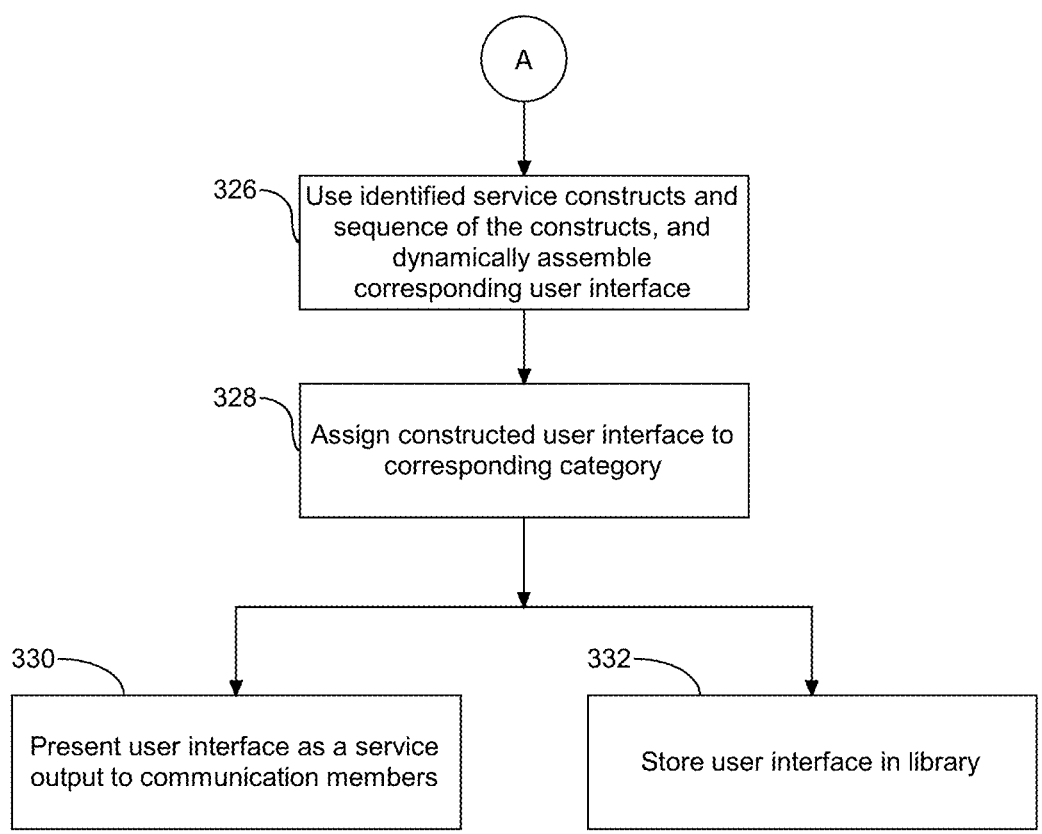

Referring to FIGS. 3A and 3B, a flow chart (300) is provided to illustrate a process for dynamically constructing a UI. It is understood that communication may come in different forms, including, but not limited to, text, messaging, video, etc. As shown, a NLP component dynamically detects and processes communication(s) (302). In one embodiment, the content manager (152) is utilized for the detection and processing. Examples of NLP identification and processing are shown and described in detail in FIG. 1. The detected communication(s) is parsed into components (304), and the parsed components are effectively translated into intents (306). More specifically, the translation identifies the scope of the communication and further identifies actions in support of the intents (308). The quantity of actions is assigned to the variable $X_{Total}$ (310). For each of the identified actions, X, an associated API is identified (312). In one embodiment, the identified API may be applied to two or more of the identified actions. After the APIs are identified, they are subject to sequencing and logically arranged (314). The quantity of identified and sequenced APIs are assigned to the variable $Y_{Total}$ (316), and an associated API counting variable, Y, is initialized (318). In sequence, each API is translated into a user interface (UI) service construct (320), followed by an increment of the API counting variable (322). It is then determined if all of the APIs have been evaluated (324). A negative response to the determination at step (324) is followed by a return to step (320), and a positive response to the determination concludes the UI service construct identification. Following the identification and based on the sequence of the service constructs, a UI, such as a graphical user interface (GUI) is dynamically constructed (326). Accordingly, the detect communication(s) is processed for action identification and construction of a corresponding UI.

It is understood that communications may have a characteristic of characterizing data. For example, the communication may be directed at professional tasks which would have a professional characteristic, or it may be directed at non-professional tasks, such as domestic or personal tasks. The constructed UI is characterized and assigned to a corresponding category (328), which in one embodiment is based on characteristic data of the communication. Similarly, in one embodiment, the category assignment may correspond to one or more of the APIs or UI service constructs. Following step (328), the UI is constructed at a service output and presented for use to one or more members of the monitored or detected communication (330). In addition, and in one embodiment parallel to the presentation at step (330), the UI is constructed and stored in a UI library (332). Similarly, in one embodiment, the library organizes the stored UIs based on their category assignment. Accordingly, as shown herein, the UI is constructed from a dynamic source providing a match or service output and optimized action suggestions for one or more members of the communication.

Figure 4A:
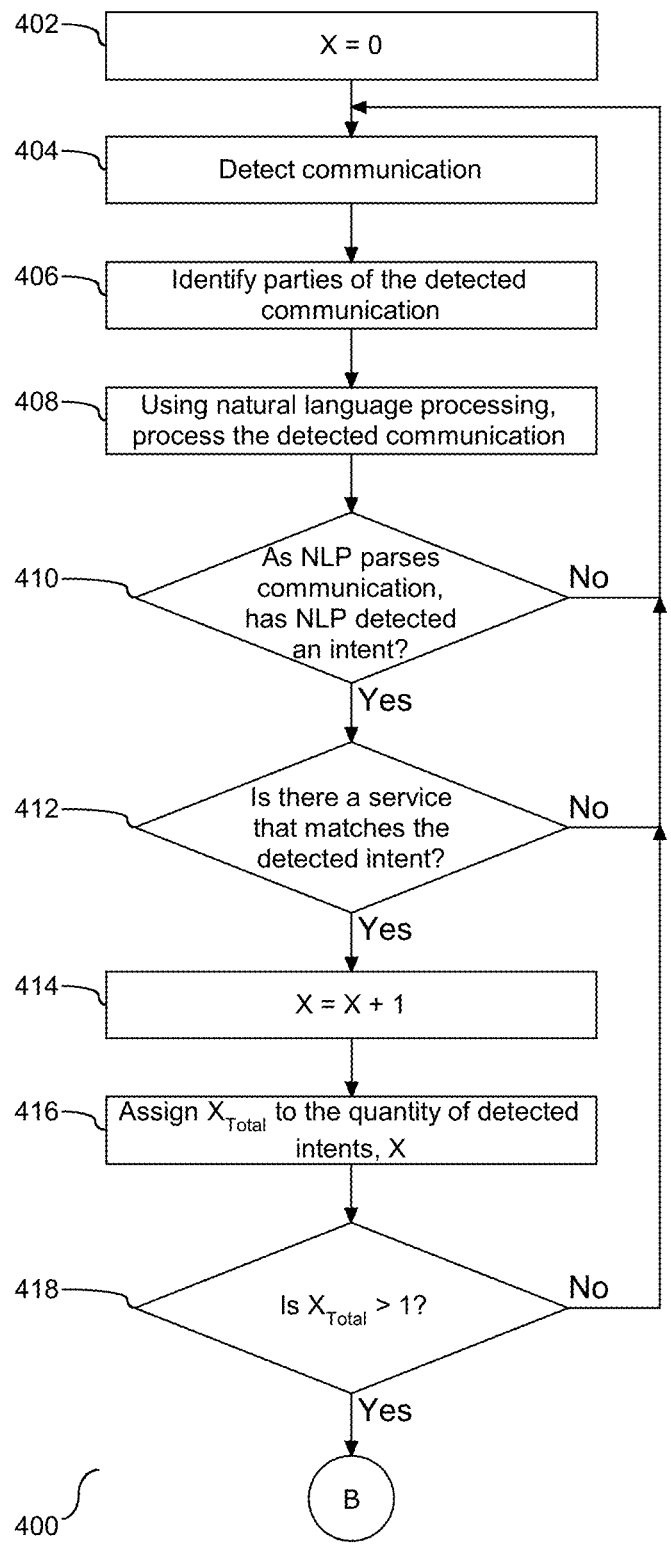
FIGS. 4A and 4B depict a flow chart illustrating employing machine learning technology into the UI categorization and construction.
Figure 4B:
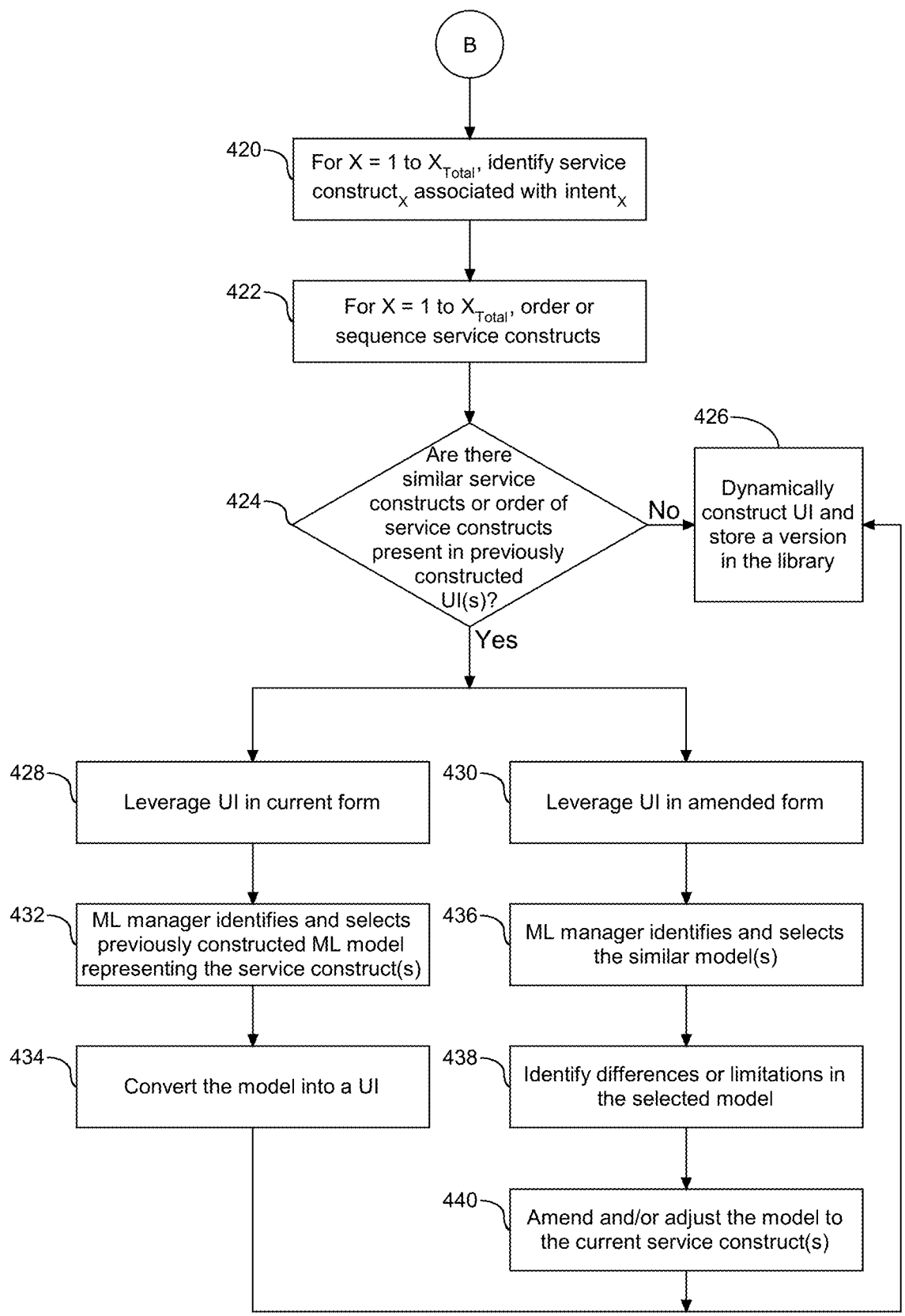

As shown and described in FIG. 1, machine learning is leveraged with the observed and detected communications together with the UI development. Referring to FIGS. 4A and 4B, a flow chart (400) is provided to illustrate an embodiment employing machine learning technology into the UI categorization and construction. An intent counting variable is initialized (402). At such time as a communication is detected (404), including, but not limited to, text, audio, video, etc., the parties of the communication are identified (406). With respect to communication, the parties may be identified by a corresponding email address or similar identifier. As shown and described in FIGS. 1 and 3, NLP is utilized to process the detected communication (408). As the NLP parses the communication(s) into components, it is determined if an intent has been detected (410). A negative response to the determination at step (410) is followed by a return to step (402) for continued monitoring of the communication. However, a positive response to the determination at step (410) is followed by ascertaining if there is a service that matches the detected intent (412). Similar to the determination at step (410), a negative response to the determination at step (412) is followed by a return to step (402) for continued communication monitoring. A positive response to the determination at step (412) is followed by incrementing the intent counting variable (414). The quantity of detected intents is calculated and assigned to the variable $X_{Total}$ (416). It is then determined if the variable $X_{Total}$ is greater than one (418). A negative response is followed by a return to step (402) for continued monitoring of the communication, and a positive response is followed by service identification. In one embodiment, the comparison integer value at step (418) is configurable, and as such, should not be limited to the integer shown and described. Accordingly, the first aspect of identifying a service commensurate with the detect communication is related to intent detection.

It is understood that a single intent may be indicative of a corresponding service. However, multiple intents may be utilized to identify or search for a service that aligns closely with multiple detected intents. A positive response to the determination at step (418) is followed by identifying service constructs commensurate with the intents (420), and as shown in FIGS. 3A and 3B, placing the identified services into an order. The ML manager (158) shown and described in FIG. 1 is leveraged to evaluate the identified service constructs, and in one embodiment, the ordering of the identified service constructs (422). As shown, the ML manager (158) determines if there are one or more similar or compatible models of service constructed from a previously constructed UI (424). Referring to FIGS. 3A and 3B, previously constructed UIs are categorized and stored in the knowledge base. In one embodiment, the evaluated services and service constructs identifies one or more categories of services, which are leveraged at step (424) to identify a similar or compatible model. A negative response to the determination at step (424) is followed by dynamically constructing a UI and storing the constructed UI in a corresponding UI library (426), e.g. the library operatively connected to the knowledge base (160). However, a positive response to the determination at step (424) is an indication that at least one of the identified model(s) should be available for the current intents. In one embodiment, the similarity of the identified model(s) with the intents and services of the detected communication are evaluated and categorized. Following step (424), the identified model(s) may be leveraged from its current form (428) or it may be leveraged in an amended form (430). The current form is followed by the ML manager identifying and selecting the previously constructed ML model representing the service construct(s) (432), converting the model into a UI (434), and returned to step (426) for UI construction. The amended direction is followed by the ML manager identifying and selecting the similar model(s) (436), identifying differences or limitations in the selected model (438), amending and/or adapting the model to the current service construct(s) (440), and returning to step (426) for UI construction. In one embodiment, the amending and/or adapting aspect may be directed at re-arranging an order of the APIs, adding or removing select APIs, etc. Accordingly, as shown herein ML is utilized in the service construct representation and model identification for generating a corresponding UI.

Referring to FIG. 5, a block diagram (500) is provided to illustrate an example data structure of model categorization. As shown, there are a plurality of fields in the data structure (510), including an identifier (520), a model (530), a category (540), and a sequence of APIs commensurate with the model (550). There are four model entries shown herein, although the quantity should not be considered limiting. As shown, $model_0$ (532), is shown with $identifier_0$ (534), $category_0$ (536), and a sequence, $sequence_0$, of APIs (538), $model_1$ (542), is shown with $identifier_1$ (544), $category_1$ (546), and a sequence, $sequence_1$, of APIs (548), $model_2$ (552), is shown with $identifier_2$ (554), $category_2$ (556), and a sequence, $sequence_2$, of APIs (558), and $model_3$ (562), is shown with $identifier_3$ (564), $category_3$ (566), and a sequence, $sequence_3$, of APIs (568). Accordingly, the data structure (510) is a tool that collates the models and associated identifiers or identifying characteristics, that in one embodiment, may be leveraged by the ML manager to efficient and effective construction of a UI.

Figure 6:
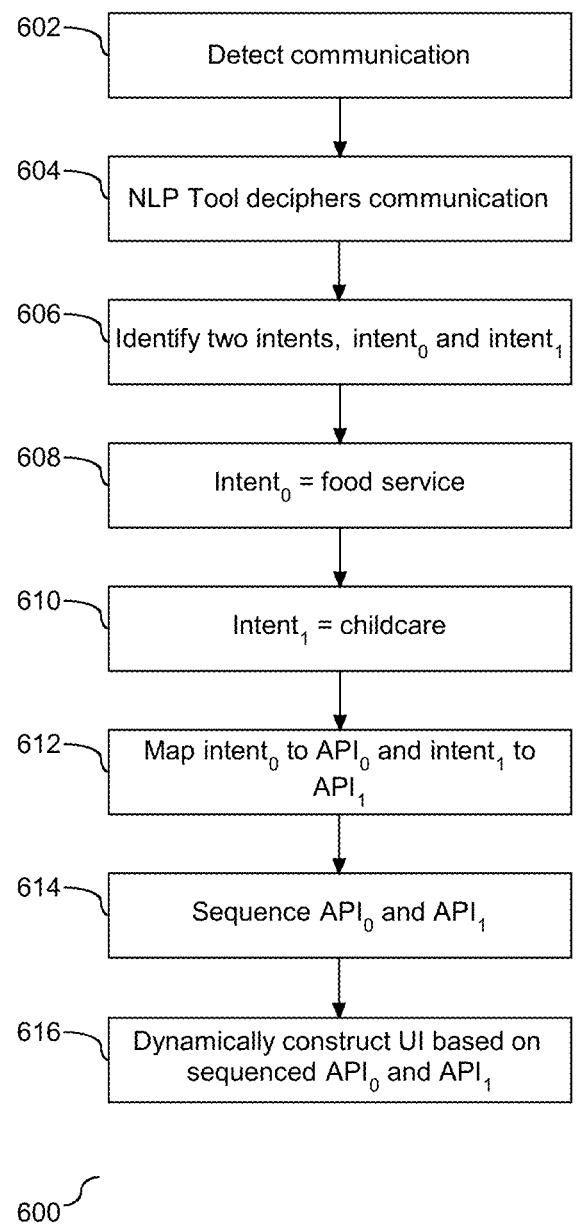
FIG. 6 depicts a flow chart illustrating a use case for dynamic construction of a UI utilizing NLP and ML.

To further demonstrate the embodiment and referring to FIG. 6, a flow chart (600) is provided to illustrate a usecase for dynamic construction of a UI utilizing NLP and ML. As shown, a communication is detected (602), and NLP is used to decipher the communication (604). In this example, the communication is directed at domestic affairs and two intents are identified (606). One of the intents, $intent_0$, is directed at food, and more specifically food service (608), and the other intent, $intent_1$, is directed at childcare (610). The identified intents are mapped to two APIs, with one API, $API_0$, directed at $intent_0$, food service, and the other API, $API_1$, directed at $intent_1$, child care (612). The APIs are sequenced (614), and a UI is dynamically constructed based on the sequenced of the APIs (616). In this example, the UI utilizes the functionality of $API_0$ to order food and schedule delivery of the ordered food, and the functionality of $API_1$ to schedule pickup of a child from day care that does not conflict with the scheduled food delivery. Accordingly, the intent of the detected communication is realized in a dynamically constructed UI so that the child care and food service needs are met and on schedule.

As shown and described herein, the supported embodiments may be in the form of a system with an intelligent computer platform for dynamically integrated content processing with UI modeling. Embodiments may also be in the form of a computer program device for use with an intelligent computer platform in order to assist the intelligent computer platform to dynamically integrated content processing and UI modeling. The device has program code embodied therewith. The program code is executable by a processing unit to support the managers and tools of the knowledge engine (150), the UI modeling, and the associated processes. The content processing supported by the NLP may be performed in accordance to slot grammar logic (SGL) or any other form of natural language processing.

With references to FIG. 7, a block diagram (700) is provided illustrating an example of a computer system/server (702), hereinafter referred to as a host (702) in communication with a cloud based support system, to implement the system and processes described above with respect to FIGS. 1-6. Host (702) is operational with numerous other general purpose or special purpose computing system environments or configurations. Examples of well-known computing systems, environments, and/or configurations that may be suitable for use with host (702) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (702) may be described in the general context of computer system-executable instructions, such as program modules, being executed by a computer system. Generally, program modules may include routines, programs, objects, components, logic, data structures, and so on that perform particular tasks or implement particular abstract data types. Host (702) may be practiced in distributed cloud computing environments (710) where tasks are performed by remote processing devices that are linked through a communications network. In a distributed cloud computing environment, program modules may be located in both local and remote computer system storage media including memory storage devices.

Figure 7:
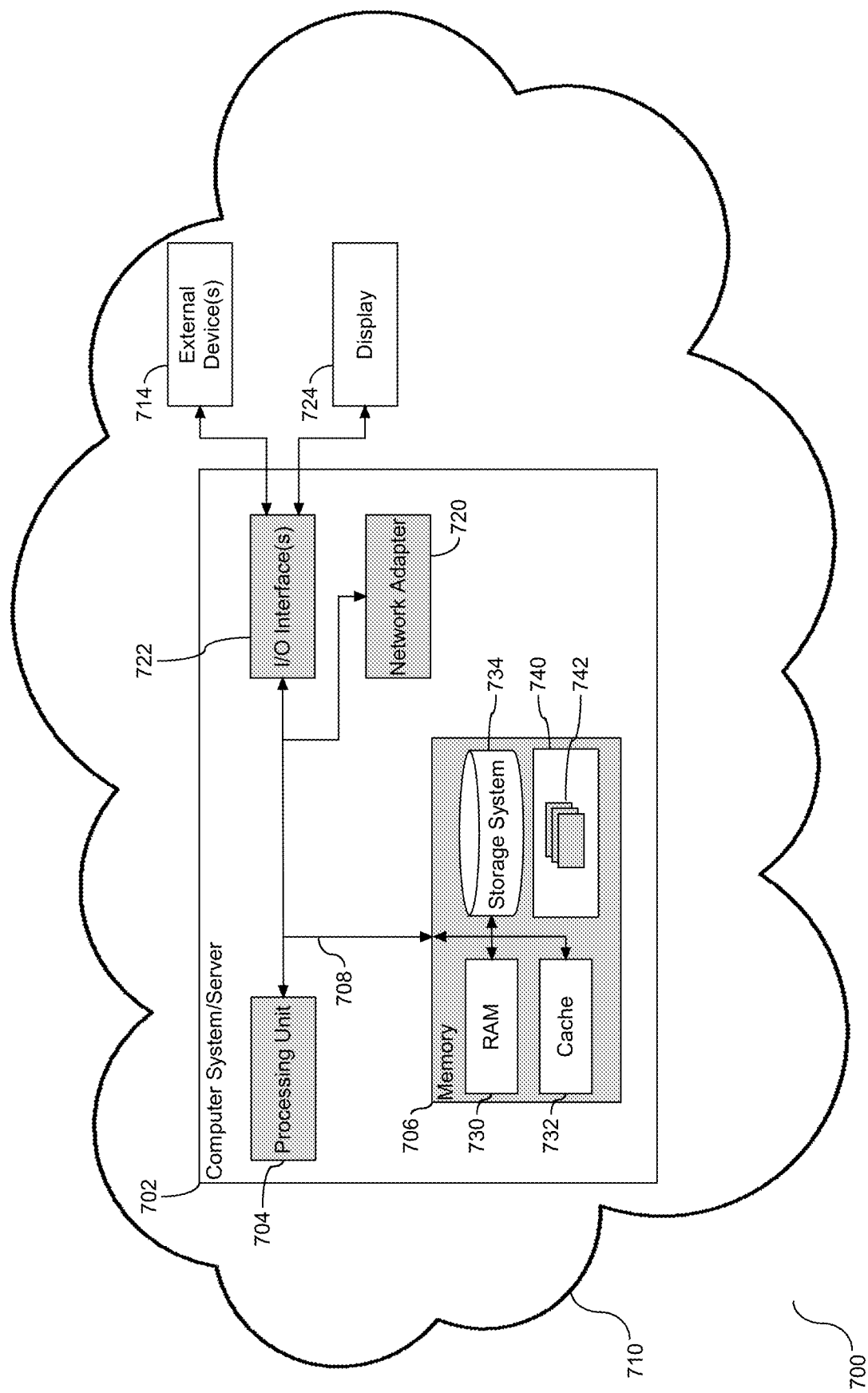
FIG. 7 is a block diagram illustrating an example of a computer system/server of a cloud based support system, to implement the system and processes described above with respect to FIGS. 1-6.

As shown in FIG. 7, host (702) is shown in the form of a general-purpose computing device. The components of host (702) may include, but are not limited to, one or more processors or processing units (704), a system memory (706), and a bus (708) that couples various system components including system memory (706) to processor (704). Bus (708) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (702) typically includes a variety of computer system readable media. Such media may be any available media that is accessible by host (702) and it includes both volatile and non-volatile media, removable and non-removable media.

Memory (706) can include computer system readable media in the form of volatile memory, such as random access memory (RAM) (730) and/or cache memory (732). By way of example only, storage system (734) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (708) by one or more data media interfaces.

Program/utility (740), having a set (at least one) of program modules (742), may be stored in memory (706) by way of example, and not limitation, as well as an operating system, one or more application programs, other program modules, and program data. Each of the operating systems, one or more application programs, other program modules, and program data or some combination thereof, may include an implementation of a networking environment. Program modules (742) generally carry out the functions and/or methodologies of embodiments to cognitive hierarchical content processing and distribution directed at delivery execution. For example, the set of program modules (742) may include the modules configured as the knowledge engine, content manager, classification manager, interface manager, and ML manager, as described in FIG. 1.

Host (702) may also communicate with one or more external devices (714), such as a keyboard, a pointing device, a sensory input device, a sensory output device, etc.; a display (724); one or more devices that enable a user to interact with host (702); and/or any devices (e.g., network card, modem, etc.) that enable host (702) to communicate with one or more other computing devices. Such communication can occur via Input/Output (I/O) interface(s) (722). Still yet, host (702) can communicate with one or more networks such as a local area network (LAN), a general wide area network (WAN), and/or a public network (e.g., the Internet) via network adapter (720). As depicted, network adapter (720) communicates with the other components of host (702) via bus (708). In one embodiment, a plurality of nodes of a distributed file system (not shown) is in communication with the host (702) via the I/O interface (722) or via the network adapter (720). It should be understood that although not shown, other hardware and/or software components could be used in conjunction with host (702). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (706), including RAM (730), cache (732), and storage system (734), such as a removable storage drive and a hard disk installed in a hard disk drive.

Computer programs (also called computer control logic) are stored in memory (706). Computer programs may also be received via a communication interface, such as network adapter (720). Such computer programs, when run, enable the computer system to perform the features of the present embodiments as discussed herein. In particular, the computer programs, when run, enable the processing unit (704) to perform the features of the computer system. Accordingly, such computer programs represent controllers of the computer system.

In one embodiment, host (702) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Examples of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 8:
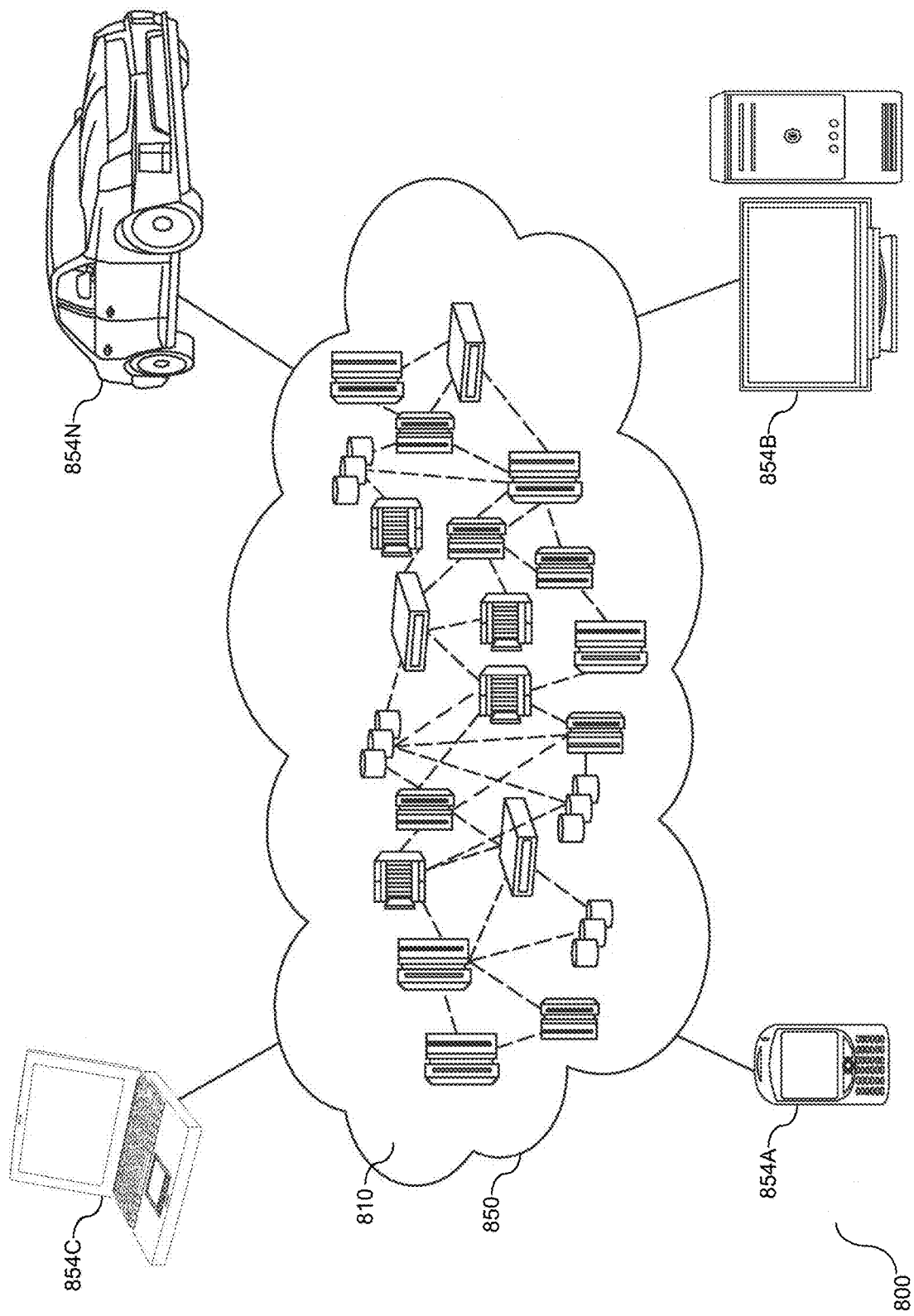
FIG. 8 depicts a block diagram illustrating a cloud computer environment.

Referring now to FIG. 8, an illustrative cloud computing network (800). As shown, cloud computing network (800) includes a cloud computing environment (850) having one or more cloud computing nodes (810) with which local computing devices used by cloud consumers may communicate. Examples of these local computing devices include, but are not limited to, personal digital assistant (PDA) or cellular telephone (854A), desktop computer (854B), laptop computer (854C), and/or automobile computer system (854N). Individual nodes within nodes (810) may further communicate with one another. They may be grouped (not shown) physically or virtually, in one or more networks, such as Private, Community, Public, or Hybrid clouds as described hereinabove, or a combination thereof. This allows cloud computing environment (800) to offer infrastructure, platforms and/or software as services for which a cloud consumer does not need to maintain resources on a local computing device. It is understood that the types of computing devices (854A-N) shown in FIG. 8 are intended to be illustrative only and that the cloud computing environment (850) can communicate with any type of computerized device over any type of network and/or network addressable connection (e.g., using a web browser).

Figure 9:
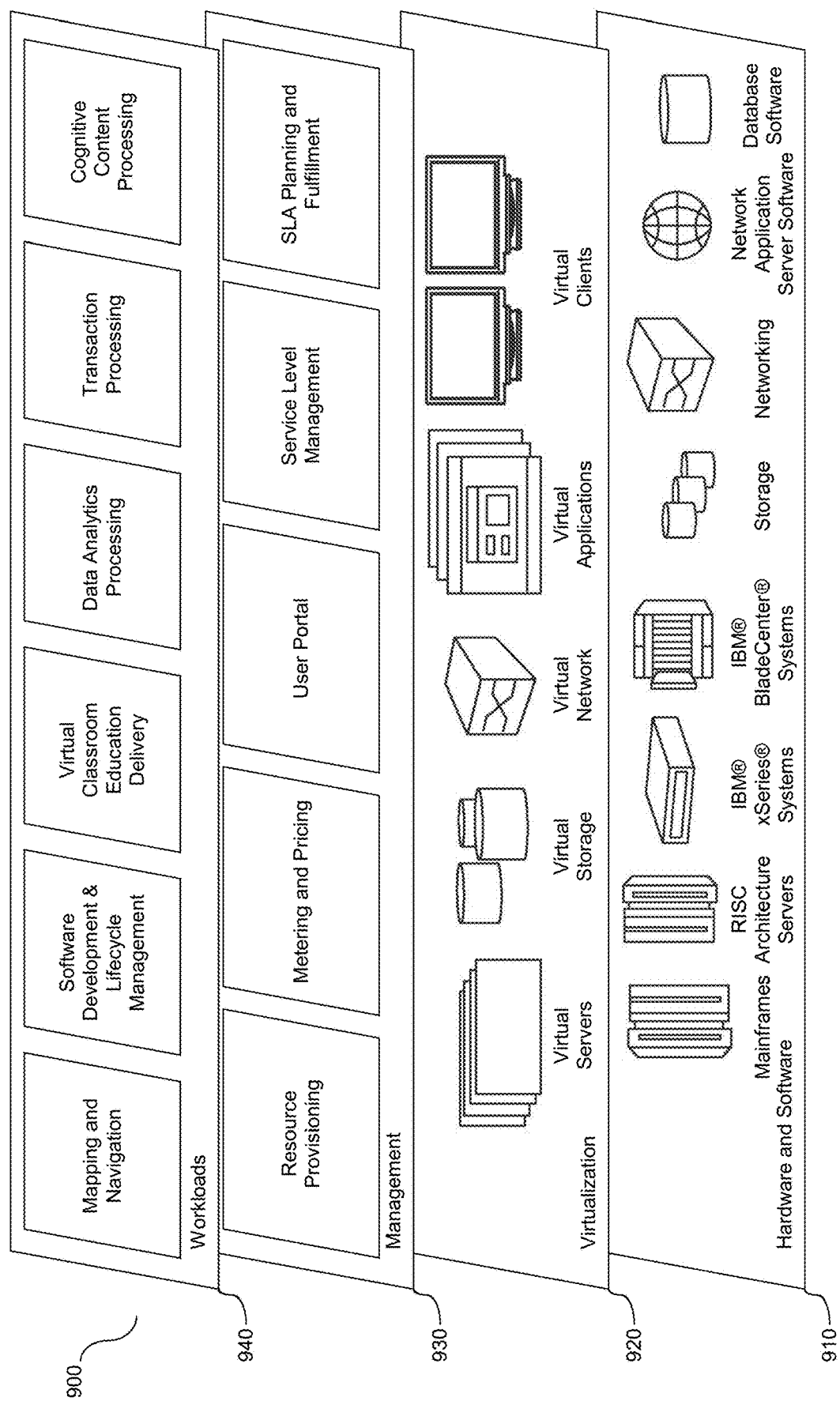
FIG. 9 depicts a block diagram illustrating a set of functional abstraction model layers provided by the cloud computing environment.

Referring now to FIG. 9, a set of functional abstraction layers (900) provided by the cloud computing network of FIG. 8 is shown. It should be understood in advance that the components, layers, and functions shown in FIG. 9 are intended to be illustrative only, and the embodiments are not limited thereto. As depicted, the following layers and corresponding functions are provided: hardware and software layer (910), virtualization layer (920), management layer (930), and workload layer (940). The hardware and software layer (910) includes hardware and software components. Examples of hardware components include mainframes, in one example IBM zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (920) provides an abstraction layer from which the following examples of virtual entities may be provided: virtual servers; virtual storage; virtual networks, including virtual private networks; virtual applications and operating systems; and virtual clients.

In one example, management layer (930) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (940) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and cognitive content processing.

While particular embodiments have been shown and described, it will be obvious to those skilled in the art that, based upon the teachings herein, changes and modifications may be made without departing from the embodiments and their broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to the embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of a machine learning model based on pattern dissection of content and associated classification modeling and processing.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to the disclosed embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. In particular, the natural language processing may be carried out by different computing platforms or across multiple devices. Furthermore, the data storage and/or corpus may be localized, remote, or spread across multiple systems. Accordingly, the scope of protection of the embodiments is limited only by the following claims and their equivalents.

What is claimed is:

1. A computer system comprising:
    a processing unit operatively coupled to memory;
    a tool in communication with the processing unit, the tool to integrate natural language processing (NLP) with user interface (UI) development, the tool comprising:
        a content manager to dynamically detect and monitor a communication, including parse the communication into two or more components;
        the content manager to translate the two or more parsed communication components to two or more service intents, including identify a scope for each of the two or more service intents for the parsed components;
        using the identified scopes and the translated service intents, the content manager to identify one or more actions in support of each of the translated service intents, and assign a sequence to the identified actions;
        a classification manager to translate the sequence of the identified actions to two or more application program interfaces (APIs) and to logically sequence the two or more APIs, wherein the sequence is determined by the identified service intents;
        an interface manager to dynamically construct a UI as a representation of a computer system service response and one or more further recommended actions, the constructed UI utilizing the translated two or more sequenced APIs with the assigned sequence of the identified actions;
        the interface manager to train a machine learning manager to categorize the constructed UI;
        the content manager to observe the communication and evaluate the observed communication with respect to two or more categorized UIs, and selectively match the evaluated communication with at least one of the categorized UIs; and
        the interface manager to dynamically amend the selectively matched UI reflecting one or more differences between the selectively matched UI and one or more actions associated with the parsed communication; and
        output the amended selectively matched UI to one or more members of the detected communication, the amended selectively matched being a service output commensurate with the dynamically monitored communication.

2. The system of claim 1, wherein the constructed UI matches service output and an optimized action suggestion for one or more members of the detected communication.

3. The system of claim 1, further comprising the content manager to leverage a natural language processing (NLP) tool to parse the dynamically detected communication, the NLP tool to evaluate communication content and determine intent commensurate with the content.

4. The system of claim 1, further comprising the content manager to correlate the two or more actions to the parsed communication to provide the sequence to the two or more actions.

5. The system of claim 1, wherein the sequence to the two or more actions are determined by the identified service category.

6. A computer program product to integrate natural language processing (NLP) with user interface (UI) development comprising a computer readable storage device having program code embodied therewith, the program code executable by a processing unit to:
    dynamically detect and monitor a communication, including parse the communication into two or more components;
    translate the two or more parsed communication components to two or more service intents, including identify a scope for each of the two or more service intents for the parsed components;
    using the identified scopes and the translated service intents to identify one or more actions in support of each of the translated service intents, and assign a sequence to the identified actions;
    translate the sequence of the identified actions to two or more application program interfaces (APIs) and logically sequence the two or more APIs, wherein the sequence is determined by the identified service intents;
    dynamically construct the UI as a representation of a computer system service response and one or more further recommended actions, the constructed UI utilizing the translated two or more sequenced APIs with the assigned sequence of the identified actions;
    train a machine learning manager to categorize the constructed UI;
    observe the communication and evaluate the observed communication with respect to two or more categorized UIs, and selectively match the evaluated communication with at least one of the categorized UIs;
    dynamically amend the selectively matched UI reflecting one or more differences between the selectively matched UI and one or more actions associated with the parsed communication; and
    output the amended selectively matched UI to one or more members of the detected communication, the amended selectively matched UI being a service output commensurate with the dynamically monitored communication.

7. The computer program product of claim 6, wherein the constructed UI matches service output and an optimized action suggestion for one or more members of the detected communication.

8. The computer program product of claim 6, further comprising program code to leverage a natural language processing (NLP) tool for parsing the dynamically detected communication, the NLP tool to evaluate communication content and determine intent commensurate with the content.

9. The computer program product of claim 6, further comprising program code to correlate the two or more actions to the parsed communication to provide the sequence to the two or more actions.

10. The computer program product of claim 6, wherein the sequence to the two or more actions are determined by the identified service category.

11. A method for integrating natural language processing (NLP) with user interface (UI) development comprising:
dynamically detecting and monitoring a communication, including parsing the communication into two or more components;
translating the two or more parsed communication components to two or more service intents, including identifying a scope for each of the two or more service intents for the parsed components;
using the identified scopes and the translated service intents to identify one or more actions in support of each of the translated service intents, and assign a sequence to the identified actions;
translating the sequence of the identified actions to two or more application program interfaces (APIs) and to logically sequence the two or more APIs, wherein the sequence is determined by the identified service intents;
dynamically constructing a UI as a representation of a computer system service response and one or more further recommended actions, the constructed UI utilizing the translated two or more sequenced APIs with the assigned sequence of the identified actions;
training a machine learning manager to categorize the constructed UI;
observing the communication and evaluate the observed communication with respect to two or more categorized UIs, and selectively match the evaluated communication with at least one of the categorized UIs; and
dynamically amending the selectively matched UI reflecting one or more differences between the selectively matched UI and one or more actions associated with the parsed communication; and
outputting the amended selectively matched UI to one or more members of the detected communication, the amended selectively matched UI being a service output commensurate with the dynamically monitored communication.

12. The method of claim 11, wherein the constructed UI matches service output and an optimized action suggestion for one or more members of the detected communication.

13. The method of claim 11, further comprising leveraging a natural language processing (NLP) tool for parsing the dynamically detected communication, the NLP tool evaluating communication content and determining intent commensurate with the content.

14. The method of claim 11, further comprising correlating the two or more actions to the parsed communication to provide the sequence to the two or more actions.

15. The method of claim 11, wherein the sequence to the two or more actions are determined by the identified service category.

* * * * *